United States Patent [19]

Valavanis et al.

[11] Patent Number: 5,837,934
[45] Date of Patent: Nov. 17, 1998

[54] SHOCK INSULATED CONTAINER FOR HARD DISK DRIVES

[75] Inventors: Theodore N. Valavanis, Waukegan; Keith A. Novak, Cicero, both of Ill.

[73] Assignee: Midway Games Inc., Chicago, Ill.

[21] Appl. No.: 759,071

[22] Filed: Dec. 2, 1996

[51] Int. Cl.[6] .................................................. H02G 3/08
[52] U.S. Cl. ...................... 174/52.1; 206/521; 206/701; 361/685
[58] Field of Search ................................ 174/35 R, 52.1, 174/52.4; 361/679, 680, 681, 683, 684, 685, 687, 715, 719, 752, 807; 206/709, 719, 721, 724, 521, 701, 702, 706, 707

[56] References Cited

U.S. PATENT DOCUMENTS

| | | | |
|---|---|---|---|
| 3,445,051 | 5/1969 | Goldman | 206/521 |
| 4,677,809 | 7/1987 | Long et al. | 53/427 |
| 4,709,817 | 12/1987 | Keady et al. | 206/523 |
| 5,041,924 | 8/1991 | Blackborow et al. | 360/69 |
| 5,149,048 | 9/1992 | Morehouse et al. | 248/632 |
| 5,207,342 | 5/1993 | Tsuji et al. | 220/4.02 |
| 5,426,562 | 6/1995 | Morehouse | 361/685 |
| 5,441,150 | 8/1995 | Ma | 206/707 |
| 5,473,507 | 12/1995 | Schwegler et al. | 361/690 |
| 5,587,854 | 12/1996 | Sato et al. | 360/97.1 |

FOREIGN PATENT DOCUMENTS 0 564 119 A2   3/1993   European Pat. Off. .
0 570 138 A2   4/1993   European Pat. Off. .

*Primary Examiner*—Bot L. Ledynh
*Assistant Examiner*—Hung V. Ngo
*Attorney, Agent, or Firm*—Rudnick & Wolfe; William T. Rifkin; R. Blake Johnston

[57] ABSTRACT

A shock insulated container for a disk drive features a plastic enclosure having a top hingedely secured to a bottom. The enclosure is formed of anti-static materials. A foam liner is provided to surround the hard drive. The drive and liner are encapsulated in the container, which is secured, using press fit projections. The package may then be mounted to a commercial type video game machine.

2 Claims, 2 Drawing Sheets

SHOCK INSULATED CONTAINER FOR HARD DISK DRIVES

BACKGROUND OF THE INVENTION

This invention relates to devices intended to protect hard disk drives of the type commonly found in computers from damage due to vibration. More specifically, it relates to a shock-resistant container intended for use with coin-op video games which tend to be moved by their owner from location to location on the back of pick-up trucks and the like. In such instances, both the game and its components, which may include a hard disk drive, are subjected to substantial shock loading several times the force of gravity. In this rather harsh environment, it has been found that hard disk drives which are more than able to withstand ordinary movement in a home or business environment, are damaged by the excessive forces applied during movement of the game. The result is that the benefits of providing a hard drive in an arcade-type game are nullified by excessive downtime required to repair or replace the hard drive.

By way of background, as consumers demand greater and greater realism in video games as a condition to playing such games, designers have found it desirable to incorporate detailed graphics, artwork and animations all of which require significant storage capacity. While the artwork and graphics can be stored in static memory such as EPROMS, there is also a desire and a need to store some information on hard disk drives. It is for this reason that hard drives are being incorporated into coin-operated amusement games both video and novelty type games which have significant display capabilities.

To protect the hard drives from the shock to which they are exposed during moving, it is proposed to provide a shock-resistant enclosure for the hard drive which enclosure can itself be directly mounted in the game and in which the hard drive will remain during its normal operation.

It will be recognized that one important advantage of the hard disk drive is its relatively low cost in today's marketplace. That is to say, the cost per megabyte of storage has come down significantly in the middle-1990's and thus, it has become a relatively inexpensive solution to storing large amounts of information. While it will be appreciated that a shock resistant hard drive could be designed from scratch, the cost of such a low volume device would be significantly greater than shock protecting commercially available hard drives which are not otherwise shock resistant.

It is accordingly an object of the present invention, to provide a low-cost, shock resistant enclosure in which commercially available, low-cost hard drives can be housed for use in coin-op, arcade-type games. Thus, the advantages and low cost of a hard drive are obtained without the prohibitive expense of redesigning the hard drive to withstand additional G-forces.

It is a further object of the invention to provide a shock resistant housing for a hard drive which will reduce failure rates and undesirable handling of the hard drive by service personnel when they are moving the game or servicing other components of the game.

These and other advantages of the invention will be apparent from the remaining portion of this specification.

DETAILED DESCRIPTION

Figure 1:
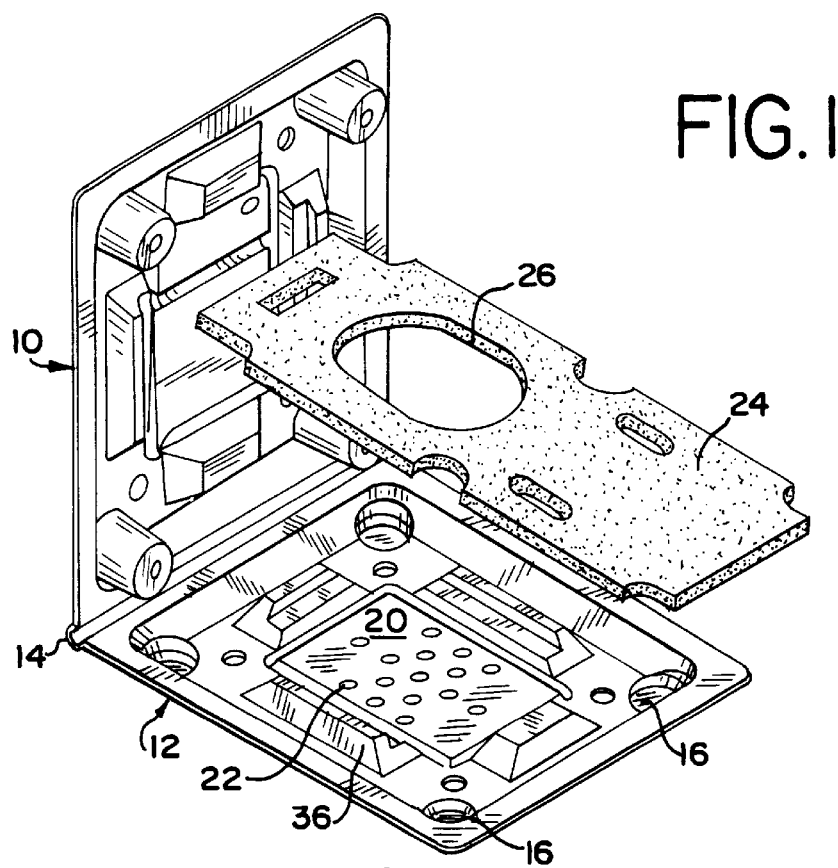
FIG. 1 is a perspective view of the shock resistant housing components according to the invention.

Referring to FIG. 1, the components of the shock resistant housing according to the invention are illustrated. The components include an enclosure formed of an upper lid 10 and a bottom 12 hingedely attached to each other at hinge point 14. The enclosure may be preferably formed from one of the many available plastics by thermal forming or other commonly available forming techniques for typical semi-rigid plastics. A preferred plastic is PETG, typically coated with an anti-static coating.

The enclosure bottom 12 includes four recessed leg sockets 16 at the outward corners thereof. A set of four corresponding legs 18 are provided on the upper lid 10 to secure the lid 10 to the bottom tray 12 after a hard drive has been inserted therein. The enclosure includes a formed central recess 20 in both the bottom tray and the lid dimensioned and configured for the particular hard drive to be received therein. Vent holes 22 may be provided in this recessed area to permit air circulation to the hard drive to ensure that it does not exceed its operating temperature.

Figure 2:
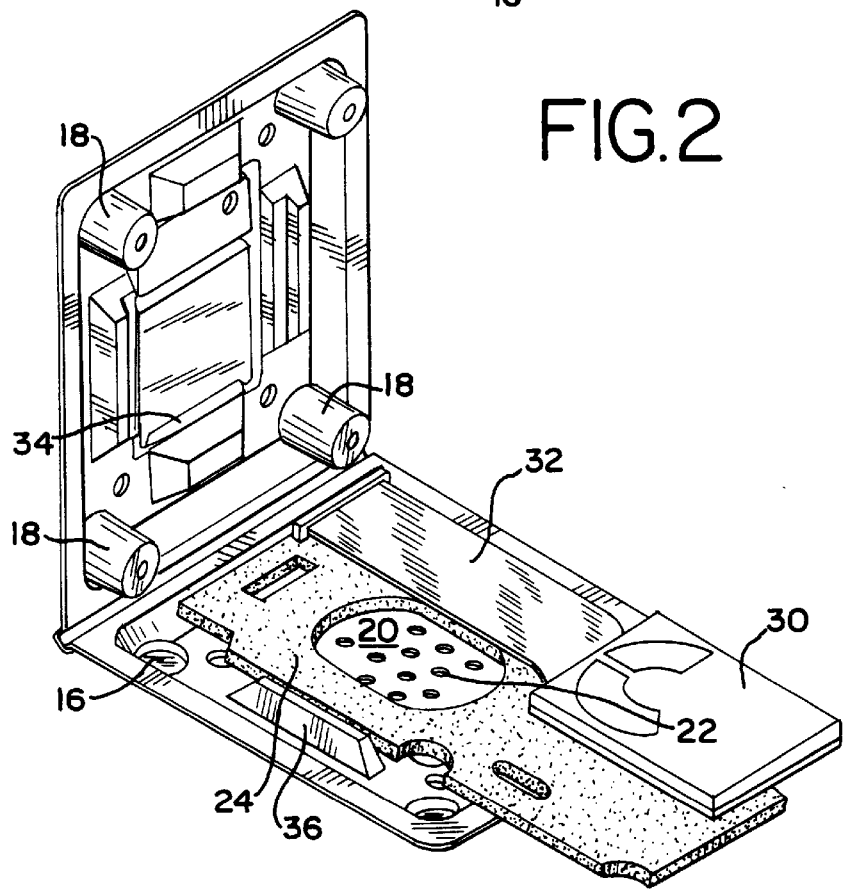
FIG. 2 is similar view illustrating the manner in which the hard drive is incorporated into the housing.
Figure 3:
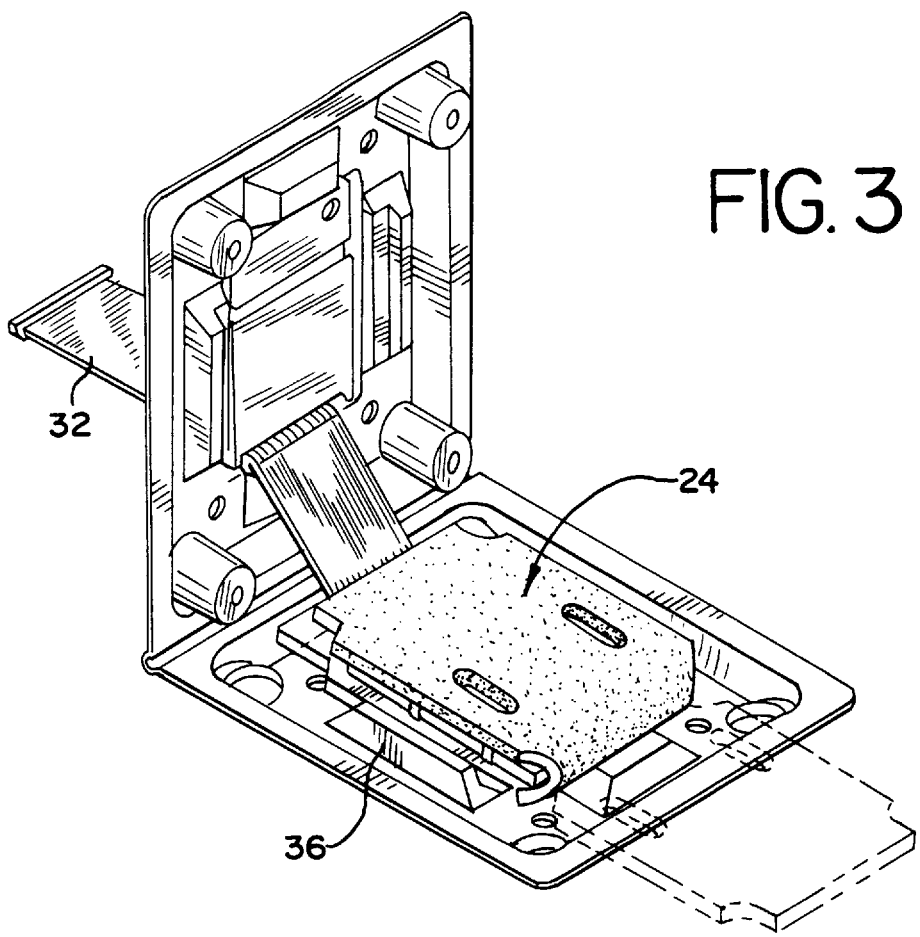
FIG. 3 is a similar view in which the hard drive is located in the housing just prior to the housing being sealed.

Before the drive is placed into the enclosure, a foam insert 24 is first placed on the bottom tray as best illustrated in FIG. 2. This foam insert is made from shock absorbing materials commonly known in this art. The shock-absorbing foam may, for example, be polyurethane/PVC blend. According to the present invention, the foam insert has an opening 26 in the portions that overly the bottom recess 20 so that the airholes 22 may communicate directly with the hard drive to circulate air thereabout. The foam insert is elongated such that it extends beyond the end of the bottom tray 12 so that it can be folded around the hard drive after the drive is placed into the enclosure thereby to surround the drive as best illustrated in FIGS. 3 and 5.

Figure 4:
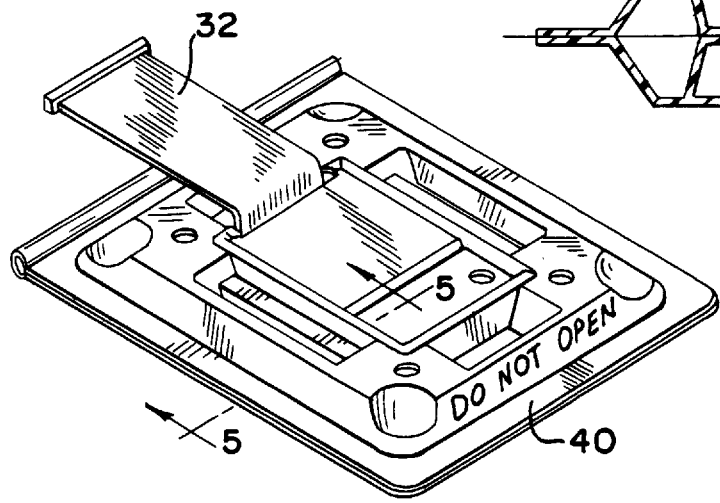
FIG. 4 is a perspective view of the housing after it has been sealed with the hard drive contained therein.

After the foam has been properly centered on the bottom tray 12, a hard drive 30 is first connected to a ribbon cable 32 of the type intended for electrically connecting the drive to the game electronics. The ribbon cable typically engages the drive at one end thereof as illustrated in FIG. 2. The ribbon cable is then passed through an opening 34 in the upper lid 10 so that it emerges from the sealed enclosure as illustrated in FIGS. 3 and 4. The hard drive is then ready to be seated within the enclosure, centered over the recess 20 on the foam insert 24. As shown in FIG. 3, after the drive is properly seated and positioned on the bottom tray between raised positioning lugs 36, the excess foam is folded over and onto the drive to create the "sandwich" as illustrated. The enclosure is then ready to be sealed after the ribbon cable 32 has been passed through the opening 34. The enclosure is sealed by simply rotating the lid 10 about its hinge point 14 onto the bottom tray and then manually forcing the legs 18 into the leg sockets 16 which press into position due to the frictional engagement of the legs in the sockets.

The resulting structure, as shown in FIG. 4, can be easily connected to the game system using the leg and leg sockets. It may be held in place by clips, screws, clamps or otherwise connected on or adjacent to the control electronics of a coin-operated arcade game. For security purposes, it may be desired to seal the package as, for example, with staples along the outer periphery 40 of the enclosure. This discourages operators from tampering with the hard drive once it has been placed in the shock resistant enclosure. Of course, other types of means for securing the enclosure may be used if desired.

Figure 5:
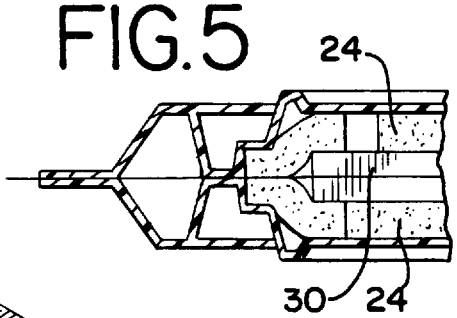
FIG. 5 is a cross-sectional view along the lines 5—5 of FIG. 4 showing the manner in which the hard drive is sandwiched within the housing surrounded on either side by insulating foam.

As shown in FIG. 5, the foam 24 sandwiches the hard drive 30 to provide significant shock resistance far exceeding that which the drive could normally stand without failure.

There is thus provided a shock resistant enclosure for a commercial hard disk drive which permits its use in environments which are normally too harsh for sustained reliable operation. While this enclosure is intended for use in coin-operated arcade games, it is apparent that the hard drive enclosure has application beyond this. Indeed, it may be used in any application where shock protection must be provided for an electronic component of the size and type of a hard disk drive and which normally does not require servicing.

While preferred embodiments of the present invention have been illustrated and described, it will be understood by those of ordinary skill in the art that changes and modifications can be made without departing from the invention in its broader aspects.

What is claimed is:

1. A shock resistant enclosure for mounting a hard disk drive comprising:
   a) an insert formed of a shock absorbing foam sheet dimensioned to be folded about said hard disk drive on the top and bottom thereof;
   b) a tray and lid formed of lightweight semi-rigid material configured to receive said hard disk drive and foam insert therein;
   c) means for securing said lid to said tray to encapsulate the hard disk drive and foam insert, said means for securing said lid to said tray including a recessed leg socket formed in said tray and a corresponding leg formed in said lid so that said recessed leg socket and said corresponding leg frictionally engage when said tray and lid snap together; and
   d) means for mounting the enclosure.

2. The device of claim 1 wherein said recessed leg socket and said corresponding leg also serve as said means for mounting the enclosure.

\* \* \* \* \*